United States Patent Office 3,319,343
Patented May 16, 1967

3,319,343
APPARATUS AND METHOD FOR FREEZE-DRYING PULVERULENT MATERIALS
Allan Thale, Kokkedal, Denmark, assignor to A/S Niro Atomizer, Soborg, Denmark
Filed Aug. 4, 1965, Ser. No. 477,183
Claims priority, application Denmark, Aug. 6, 1964, 3,891/64; July 29, 1965, 3,913/65
16 Claims. (Cl. 34—5)

ABSTRACT OF THE DISCLOSURE

An apparatus for freeze-drying pulverulent material in which a filter defiining an enclosed space is disposed in a vacuum container and fed with the pulverulent material to retain the material therein. The material is heated and agitated in the filter to release water by sublimation and the dried material is removed from the filter.

---

Figure 1:
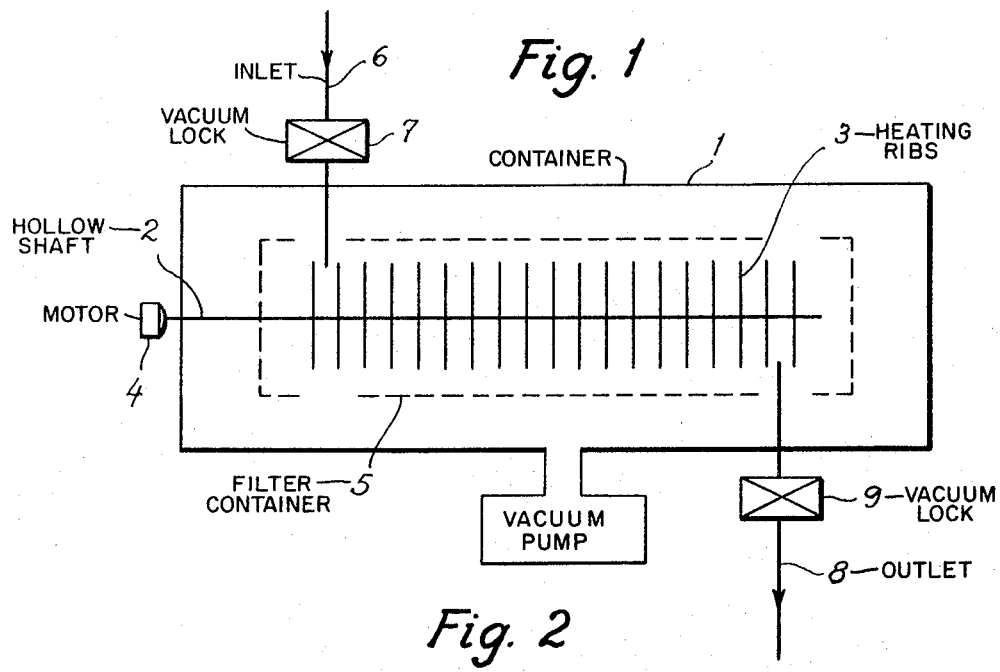

The present invention relates to apparatus for freeze-drying pulverulent materials.

Freeze-drying of substances containing water consists in freezing the substances and subsequently removing the water by sublimation of the ice and is used for drying substances which cannot be heated without losing essential qualities such as taste, solubility or biological activity. Examples of such subtances are milk, coffee, tea, fruit juice, plasma and drugs.

The known devices for freeze-drying pulverulent materials comprises a vacuum container for the material, members for maintaining the material in agitation, and members for heating the material. Such devices have substantial drawbacks because they do not permit a quick drying to be obtained by efficient utilization of the heat energy which can be transferred from the heating members to the powder since the high speeds of evaporation have the effect that the steam carries the powder out of the vacuum container to such an extent that usual filters placed in front of steam condensers become clogged and the pressure consequently rises in the vacuum container.

The apparatus according to the present invention overcomes this drawback by employing inside the vacuum container a filter for the pulverulent material which filter defines a space for containing the material. By placing the filter close to the very place where the evaporation or sublimation takes place and by providing the filter with a large surface, a maximum speed of evaporation may be utilized in the apparatus, and the latter can therefore afford a quicker drying than any hitherto known apparatus.

Moreover, the apparatus may be of considerably simpler design than that hitherto known because the filter at the same time may serve as the member which maintains the material in agitation, in which case the filter is shaped as a rotatable container.

According to the invention the filter can suitably be so arranged that it can be heated and serve as a member for heating the material. Hereby is obtained the advantage that the evaporation from the powder mainly takes place on the filter and thus the steam need not penetrate a thick powder layer before it is separated from the powder. Thereby the presence of the filter inside the vacuum container is utilized to a most pronounced degree since the powder is not blown on to the filter at all and therefore cannot clog it.

The simplest and cheapest embodiment of the apparatus is one in which the filter has the function of acting as a heating member and the function of maintaining the material in agitation whereby according to the invention the filter is the sole member which serves the purpose of maintaining the material in agitation and of heating it.

Another advantageous embodiment of the apparatus according to the invention is characterized by the feature that the space defined by the filter contains means for heating the material. Hereby it is possible, particularly if the filter also is arranged to be heated, to supply a greater amount of heat per unit of time to the powder which may be of interest when freeze-drying materials having a high melting point.

According to the invention the space defined by the filter may also be situated inside the means for heating the material. Thereby such means will act to heat the filter which in turn gives off the heat to the pulverulent material. Hereby the filter will function in an especially efficient way.

The apparatus can suitably be shaped as a cylindrical container in which the space defined by the filter likewise forms a cylindrical container. Hereby it is particularly easy to adapt the apparatus for continuous operation, e.g. by placing the container with its axis horizontal and effecting transport of the material by giving the container a slight inclination in relation to the horizontal. If the cylindrical container formed by the filter is stationary, transport of the material can be effected by means of an axial rotating heating member inside the filter container.

The space defined by the filter in the vacuum container and in which the material is disposed, need not be limited on all sides by the filter but the filter may for instance be shaped like one or more cylindrical tubes adapted to be inserted into and removed from the vacuum container so that the space containing the material is limited in part by the walls of the vacuum container and in part by the filter. Thus, replacing of the filter is facilitated.

Figure 2:
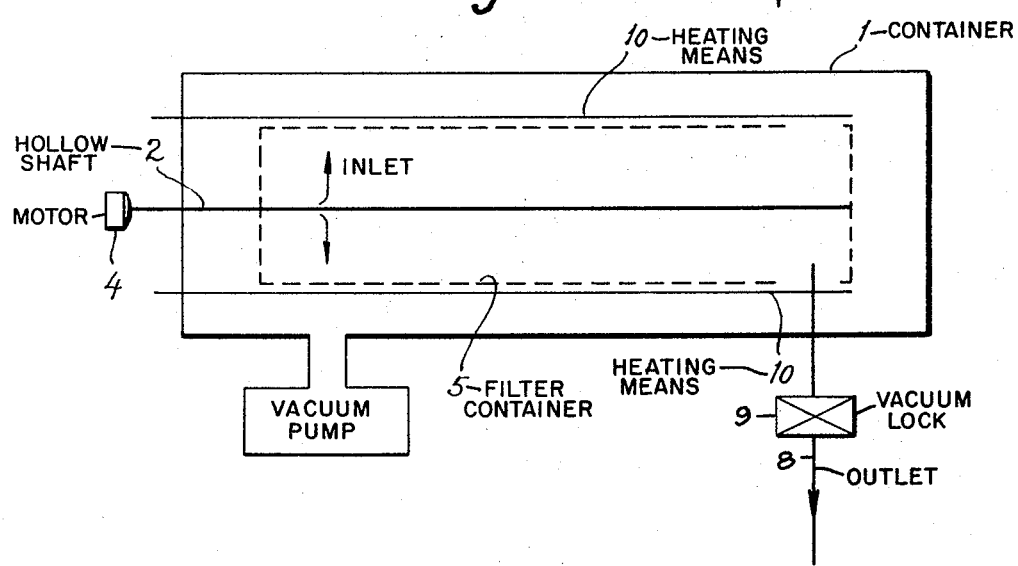

Various embodiments of the apparatus according to the invention are shown schematically in the drawing, wherein:

FIG. 1 is a diagrammatic side view of a first embodiment according to the invention; and FIG. 2 is a diagrammatic side view of a second embodiment according to the invention.

In FIG. 1 the apparatus comprises a horizontal cylindrical vacuum container 1 in which is axially mounted a heating member consisting of a hollow shaft 2 in which a heating medium may be introduced and which is provided with ribs 3. The heating member is rotated by means of a motor 4 situated outside the container. The heating member is completely surrounded by a filter container 5 of cylindrical shape, and the pulverulent frozen material is introduced inside this filter container through a conduit 6 which in case of continuous operation is provided with a vacuum lock 7. The dried material is discharged through a conduit 8 which is likewise provided with a vacuum lock 9 for continuous operation. The filter container 5 may be arranged for rotation about its axis by means of the motor 4 so that both the filter container and heating member serve as members for maintaining the pulverulent material in agitation. The vacuum container 1 is connected to well known means which have not been shown, for establishing and maintaining vacuum and for removal of the generated steam, e.g. a vacuum pump and a condenser.

In the embodiment shown in FIG. 2 the apparatus also consists of a horizontal cylindrical vacuum container 1 inside which is mounted a smaller cylindrical filter container 5 arranged to be rotated about its shaft 2 by means of a motor 4. Feeding and discharge of the pulverulent material takes place through the shaft 2 which is hollow. In this embodiment the filter container is the sole member for maintaining the pulverulent material in agitation. Heating is effected by means of heating members 10 situated outside the filter container but close to it so that

What I claim and desire to secure by letters patent is:

1. An apparatus for freeze-drying pulverulent materials comprising a vacuum container for the material, means for maintaining the material in agitation in the container, means for heating the material, and a filter inside the vacuum container defining an enclosed space in which the material is retained.

2. An apparatus as claimed in claim 1, wherein the filter is a rotatable container which maintains the material in agitation.

3. An apparatus as claimed in claim 1 wherein the means for heating the material acts to heat the filter.

4. An apparatus as claimed in claim 1, wherein the filter is the sole member which serves the purpose of maintaining the material in agitation and heating the material.

5. An apparatus as claimed in claim 1, wherein said means for heating the material is disposed in the filter.

6. An apparatus as claimed in claim 1, wherein said means for heating the material surrounds said filter.

7. In apparatus for freeze-drying pulverulent materials: a vacuum container for the material, filter means within the vacuum container defining an enclosed space for retaining the pulverulent material, means for feeding the pulverulent material into said space, means for heating the pulverulent material in said space, means for agitating the pulverulent material within said space, and means for removing the pulverulent material from said space.

8. In apparatus as claimed in claim 7 wherein the filter means is a rotatable container, said means for agitating the pulverulent material comprising means for driving the filter means in rotation.

9. In apparatus as claimed in claim 8 wherein said filter means is a container for receiving the pulverulent material, said heating means being disposed for heating the filter means which in turn heats the material.

10. In apparatus as claimed in claim 9 wherein the container constituting the filter means is rotatable and the means for agitating the material comprises means for rotating the container constituting the filter means so that the filter means is the sole means for transferring heat and agitation to the pulverulent material.

11. In apparatus as claimed in claim 7 wherein the means for heating the material is disposed within said enclosed space.

12. In apparatus as claimed in claim 7 wherein said means for heating the material is disposed within said vacuum container and surrounds said enclosed space.

13. In a method for the drying of pulverulent material by freezing the material and subsequently heating the frozen material to remove the water by sublimation of the formed ice; an improvement comprising feeding the frozen material into an enclosed space bounded by a filter, maintaining said space at a pressure below atmospheric, and heating the material within the space while agitating said material.

14. In the method of claim 13 wherein the material within the space is heated from within said space.

15. In the method of claim 13 wherein the material within the space is heated from outside said filter through the filter.

16. In the method of claim 13 wherein the material within the space is agitated by rotating the filter.

References Cited by the Examiner
UNITED STATES PATENTS

| | | | |
|---|---|---|---|
| 1,151,417 | 8/1915 | Stokes | 34—92 |
| 2,388,917 | 11/1945 | Hormel | 34—5 |
| 2,948,966 | 8/1960 | Hanson | 34—92 |
| 3,194,670 | 7/1965 | Dorsey | 34—5 |

WILLIAM J. WYE, *Primary Examiner.*